July 22, 1952     D. P. MURPHREY     2,604,233
COMBINATION TEA POT AND HOT WATER DISPENSER
Filed Aug. 17, 1948     2 SHEETS—SHEET 1
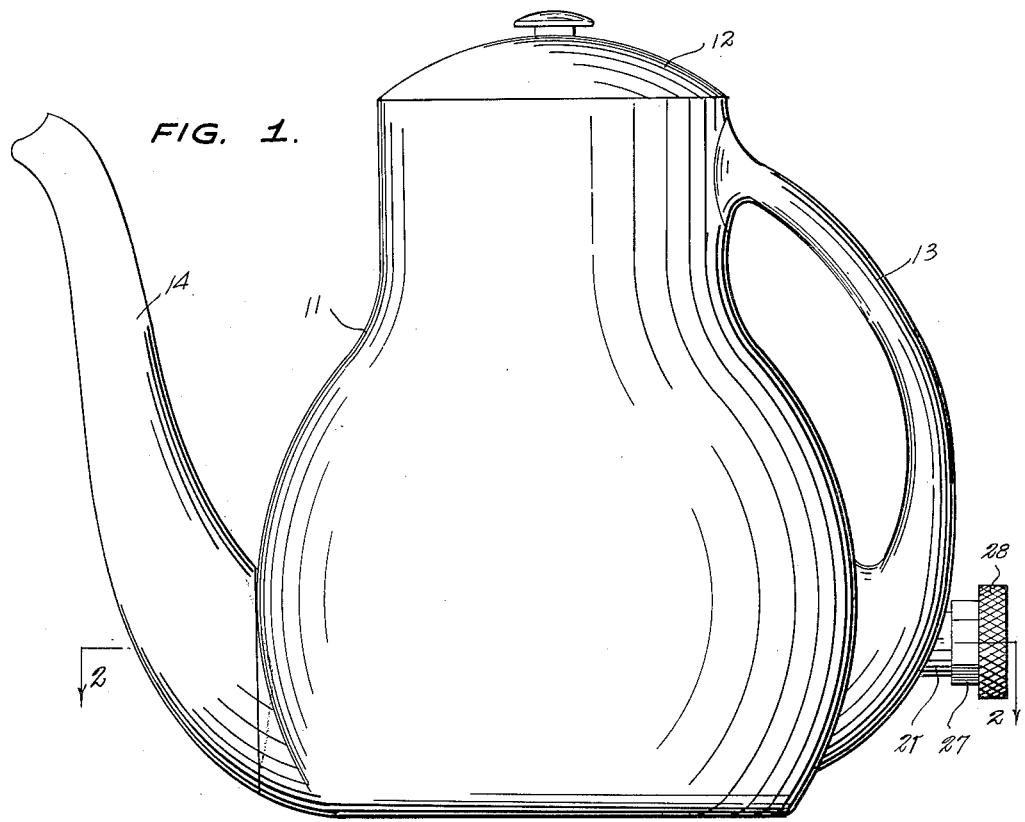
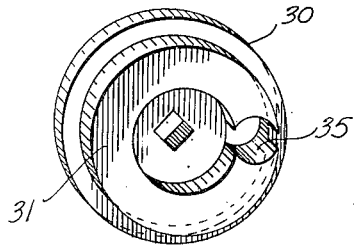
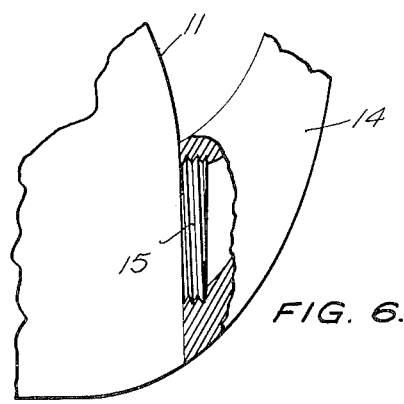
INVENTOR.
DORSEY P. MURPHREY,
BY
McMorrow, Berman + Davidson
ATTORNEYS.

Patented July 22, 1952

2,604,233

UNITED STATES PATENT OFFICE 2,604,233

COMBINATION TEA POT AND HOT WATER DISPENSER

Dorsey P. Murphrey, Grand Rapids, Mich.

Application August 17, 1948, Serial No. 44,618

2 Claims. (Cl. 222—144.5)

This invention relates to liquid dispensing vessels, and more particularly to a combination dispenser for a plurality of liquids.

A main object of the invention is to provide a novel and improved dispensing vessel adapted to contain two different liquids and provided with means for selectively pouring one or the other of the liquids, the vessel being especially intended for dispensing tea and hot water separately as required, said vessel being very simple in construction, neat in appearance, easy to clean, and easy to manipulate.

A further object of the invention is to provide an improved dual liquid dispenser which includes selector means for pouring one or the other of the liquids contained in the dispenser, said dispenser being especially useful in serving tea and hot water, or coffee and another beverage as required in dining rooms, restaurants and other places where tea, coffee and other beverages are served and eliminating the need for employing separate dispensing vessels for the two different liquids.

Further objects and advantages of the invention will become apparent from the following description and claims, and from the accompanying drawings, wherein:

Figure 1 is a side elevational view of a combined tea pot and hot water dispenser constructed in accordance with the present invention.

Figure 5 is a perspective detail view of the selector valve disc member employed in the dispenser of Figure 1.

Figure 6 is a fragmentary detail view, partly broken away and part in elevation, showing the threaded joint between the pouring spout and the main body of the dispenser of Figure 1, enabling the spout to be removed when it is desired to clean the valve parts.

Figure 2:
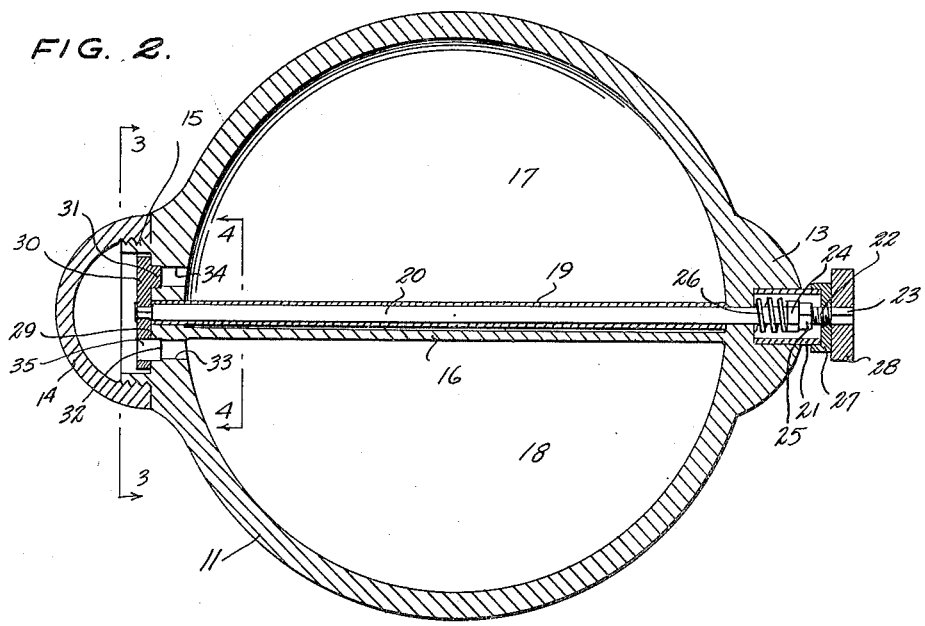
Figure 2 is a cross-sectional view taken on line 2—2 of Figure 1.
Figure 3:
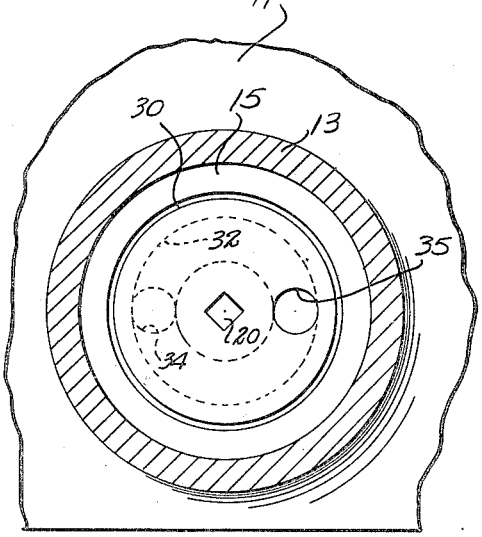
Figure 3 is an enlarged cross-sectional detail view taken on line 3—3 of Figure 2.
Figure 4:
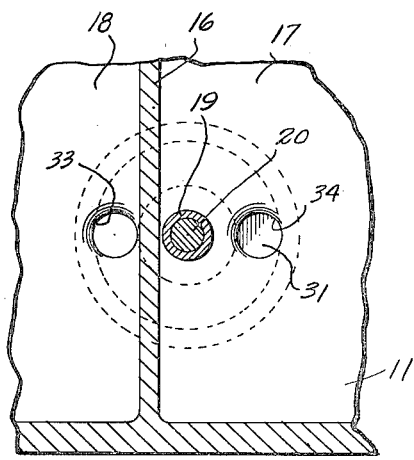
Figure 4 is an enlarged cross-sectional detail view taken on line 4—4 of Figure 2.

Referring to the drawings, the main body of the dispenser is shown at 11, said main body being of conventional outline and being provided with a removable top cover 12 and a side handle 13. Designated at 14 is a removable pouring spout which is threadedly secured to the lower portion of main body 11 in the manner shown in Figure 6, to enclose an externally threaded outlet conduit portion 15 and valve mechanism exposed in the conduit portion.

The interior of the main body 11 is formed with a vertical partition wall 16 slightly offset from the median plane of the body, as shown in Figure 2, whereby the body is divided into two separate compartments designated at 17 and 18. Rigidly secured in the lower portion of compartment 17 adjacent the partition wall 16 is a horizontal sleeve member 19 extending completely across the compartment. Rotatably positioned in said sleeve member and extending rotatably through the right hand wall of the body 11, as viewed in Figure 2, is a shaft member 20. As shown in Figure 2, the lower portion of handle 13 merges with the wall of body 11 at this point, said lower handle portion being formed with a counterbore coaxial with shaft member 20 in which is rigidly secured a short sleeve member 21. The adjacent end portion of shaft member 20 is threaded, as shown at 22, and the terminal end of said shaft member is squared, as shown at 23. Engaging threads 22 are nuts 24, 25 and encircling the shaft member 20 is a coiled spring 26 which bears between nut 24 and the inner end wall of the counterbore, biasing shaft member 20 to the right, as viewed in Figure 2. Designated at 27 is a cap nut engaged on the threads 22 and covering the outer end of sleeve 21. Rigidly secured on the squared terminal end 23 of shaft 20 is a knurled knob 28.

The outlet conduit portion 15 is coaxial with the shaft member 20 and is formed with an annular valve seat 29 on which is rotatably positioned a valve disc 30 which is rigidly secured at its center to the end of shaft member 20. As shown in Figure 5, valve disc 30 is formed with an annular rib 31 which rotatably fits into a correspondingly shaped annular groove 32 formed in the valve seat 29. Designated at 33 is a port formed in the wall of body 11 and connecting groove 32 with the compartment 18. Designated at 34 is a similar port formed in the wall of body 11 and connecting groove 32 with compartment 17. The valve disc 30 is traversed by a port 30 extending through the annular rib 31 which is registrable with either port 33 or port 34 in accordance with the adjustment of knob 28. The port 35 may be also positioned in a neutral position out of registry with either of the ports 33 or 34.

The biasing pressure exerted by spring 26 maintains the valve disc 30 tightly pressed against the valve seat 29 and prevents leakage past said valve disc.

The knob 28 and the adjacent surface of handle 13 may be suitably indexed to indicate the positions of the knob at which registry of the port 35 with the respective ports 33 and 34 is obtained.

In use of the device, two different liquids, such as tea and hot water, are placed in the compartments 17 and 18, the knob 28 being set in a neutral position wherein disc 30 covers both of the ports 33 and 34. To dispense the liquid from compartment 17, the knob 28 is rotated to a position causing the disc port 35 to register with port 34. To dispense the liquid from compartment 18, the knob 28 is rotated to a position wherein the disc port 35 registers with port 33, as shown in Figure 2.

Nut 25 acts as a lock nut to prevent loosening of nut 24. The nut 27 acts as a covering means for the sleeve 21 and is adjusted to a position wherein it may be rotated freely with respect to said sleeve.

Access to the valve disc 30 and valve seat 29 may be had for cleaning whenever required by unthreading the spout 14 from the threaded outlet conduit portion 15.

A suitable wrench may be employed to unthread spout 14 from said threaded outlet portion 15.

While shown in the drawings as having two compartments, the vessel may be formed with more than two compartments, each compartment having an outlet opening located so as to be registrable with the port 35 of valve disc 30.

While a specific embodiment of a combination dual liquid dispensing device has been disclosed in the foregoing description it will be understood that various modifications within the spirit of the invention may occur to those skilled in the art. Therefore, it is intended that no limitations be placed on the invention except as defined by the scope of the appended claims.

What is claimed is:

1. In a vessel for containing and dispensing two different liquids, a vertical hollow body having a tubular conduit portion projecting from one side thereof at a point between the upper and lower ends of said body, a pair of laterally spaced ports formed in the side of said body and providing communication between said tubular conduit portion and the interior of said body, the outer side of the body within said tubular conduit portion being formed with an annular valve seat through which said ports open into said tubular conduit portion, a pouring spout having an open lower end secured on said tubular conduit portion so as to enclose said tubular conduit portion and said valve seat and ports and provide for pouring of liquid entering said tubular conduit portion from one of the ports, a disc valve rotatably engaging said valve seat and formed with a port traversing said disc valve, a vertical partition extending across said hollow body and dividing the interior thereof into two compartments adapted to contain different liquids, one end of said partition being joined to the sidewall of said body at a point between said pair of ports whereby each port communicates with only one compartment, and means for rotating said disc valve to position its port out of registry with both of said pair of ports and to selectively register the valve disc port with either of the pair of ports.

2. In a vessel for containing and dispensing two different liquids, a vertical hollow body having a tubular conduit portion projecting from one side thereof at a point between the upper and lower ends of said body, a pair of laterally spaced ports formed in the side of said body and providing communication between said tubular conduit portion and the interior of said body, the outer side of the body within said tubular conduit portion being formed with an annular valve seat through which said ports open into said tubular conduit portion, a pouring spout having an open lower end secured on said tubular conduit portion so as to enclose said tubular conduit portion and said valve seat and ports and provide for pouring of liquid entering said tubular conduit portion from one of the ports, a disc valve rotatably engaging said valve seat and formed with a port traversing said disc valve, a vertical partition extending across said hollow body and dividing the interior thereof into two compartments adapted to contain different liquids, one end of said partition being joined to the sidewall of said body at a point between said pair of ports whereby each port communicates with only one compartment, and means for rotating said disc valve to position its port out of registry with both of said pair of ports and to selectively register the valve disc port with either of the pair of ports, said means comprising a horizontal, axially rotatable shaft extending across the interior of said body, one end of said shaft traversing the body sidewall and being fixedly connected to the disc valve and the other end of the shaft being journalled through the opposite sidewall of said body and having a knob exposed outside of said body for rotating said shaft.

DORSEY P. MURPHREY.

REFERENCES CITED

The following references are of record in the file of this patent:

UNITED STATES PATENTS

| Number | Name | Date |
|---|---|---|
| 244,537 | Booton | July 19, 1881 |
| 482,680 | Geary | Sept. 13, 1892 |
| 538,561 | Upton | Apr. 30, 1895 |
| 1,025,653 | Sims | May 7, 1912 |
| 1,043,656 | Ziringer | Nov. 5, 1912 |
| 1,693,146 | Keeler | Nov. 27, 1928 |
| 2,089,943 | Busby | Aug. 17, 1937 |
| 2,205,147 | Madsen | June 18, 1940 |